(12) United States Patent
Mattos

(10) Patent No.: US 9,453,918 B2
(45) Date of Patent: Sep. 27, 2016

(54) APPARATUS AND METHOD FOR PROCESSING RADIO NAVIGATION SIGNALS

(75) Inventor: Philip Mattos, Gloucestershire (GB)

(73) Assignee: STMicroelectronics (Research & Development) Limited, Bucks (GB)

( * ) Notice: Subject to any disclaimer, the term of this patent is extended or adjusted under 35 U.S.C. 154(b) by 700 days.

(21) Appl. No.: 13/825,724

(22) PCT Filed: Sep. 22, 2011

(86) PCT No.: PCT/EP2011/066478
§ 371 (c)(1),
(2), (4) Date: Jun. 7, 2013

(87) PCT Pub. No.: WO2012/038496
PCT Pub. Date: Mar. 29, 2012

(65) Prior Publication Data
US 2013/0257652 A1    Oct. 3, 2013

(51) Int. Cl.
*G01S 19/29* (2010.01)
*G01S 19/30* (2010.01)
*G01S 19/24* (2010.01)

(52) U.S. Cl.
CPC .............. *G01S 19/24* (2013.01); *G01S 19/246* (2013.01)

(58) Field of Classification Search
CPC ................................ G01S 19/29; G01S 19/30
USPC ............... 342/357.4, 357.63, 357.68, 357.69
See application file for complete search history.

(56) References Cited

U.S. PATENT DOCUMENTS 6,239,743 B1    5/2001    Lennen

FOREIGN PATENT DOCUMENTS

| CN | 1149361 A   | 5/1997  |
|----|-------------|---------|
| CN | 1802572 A   | 7/2006  |
| EP | 1 724 602 A1| 11/2006 |

OTHER PUBLICATIONS

Communication dated Jun. 30, 2014, from the State Intellectual Property Office of the People's Republic of China in counterpart Chinese Application No. 201180055072.0.

*Primary Examiner* — Dao Phan
(74) *Attorney, Agent, or Firm* — Sughrue Mion, PLLC

(57) ABSTRACT

An apparatus for processing a radio navigation signal. The apparatus has a first correlator correlating a first signal component with a first code, providing a first output, and having a carrier frequency and data. The apparatus also has a second correlator is configured to correlate a second signal component with a second code, providing a second output, and being different from the first code, the second signal component having the same carrier frequency as the first signal component and the same data as the first signal component. Each of real (I) and imaginary (Q) parts of the second output are delayed relative to respective parts of the first output such that the data on the second signal component is delayed with respect to the data on the first signal component, providing a delayed second output. The processor processes the outputs, their data being aligned to provide frequency information about the carrier.

18 Claims, 4 Drawing Sheets

APPARATUS AND METHOD FOR PROCESSING RADIO NAVIGATION SIGNALS

CROSS REFERENCE TO RELATED APPLICATIONS

This application is a National Stage of International Application No. PCT/JP2011/066478, filed on Sep. 22, 2011, which claims priority from British Patent Application No. 1016079.4, filed on Sep. 24, 2010, the contents of all of which are incorporated herein by reference in their entirety.

BACKGROUND OF THE INVENTION (1) Field of the Invention

The present invention relates to an apparatus and method and in particular but not exclusively for the acquisition of signals.

(2) Description of Related Art

In an example of a global navigation satellite system satellites orbiting the earth in known orbit paths with accurately known positions are used. These satellites transmit signals which can be received by a receiver on earth. Using signals received from four or more satellites, the receiver is able to determine its position using trigonometry. The signals transmitted by the satellite comprise pseudo-random codes. The accuracy of the determination of position is dependent on factors such as the repetition rate of the code, the components of the receiver and atmospheric factors.

GALILEO is a European initiative for a global navigation satellite system which provides a global positioning service. It has been proposed that GALILEO be interoperable with the global positioning system GPS and GLONASS, the two other global satellite navigation systems. It should be appreciated that the term GNSS is used in this document to refer to any of these global positioning systems.

GALILEO currently has a system of thirty satellites, twenty-seven operational satellites with three operational in-orbit spares. The proposed frequency spectrum for GALILEO has two L-bands. The lower L-band, referred to as E5a and E5b, operate in the region of 1164 MHz to 1214 MHz. There is also an upper L-band operating from 1559 MHz to 1591 MHz.

In GPS and GALILEO, signals are broadcast from satellites which include the pseudo random codes which are processed at a receiver to determine position data. The processing involves first determining the relative offset of the received codes with locally generated versions of the codes (acquisition) and then determining the position once the relative offset is determined (tracking). Both acquisition and tracking involve correlating received signals with a locally generated version of the pseudo random codes over an integration period.

In spread spectrum systems, acquisition may be difficult because it is two dimensional (frequency and time). A further difficulty is that because the signals are much weaker inside as compared to outside, it is much more difficult to acquire signals indoors. In particular, the indoor operation of GNSS requires the reception of signals attenuated by at least 20 dB from the outdoor equivalents.

Acquisition is carried out by a trial and error searching of cells corresponding to a frequency and phase range. The number of cells in the time domain is for example 4092. The number of cells in the frequency domain increases with a drop in signal strength. This however may be reduced with use of a temperature controlled crystal oscillator TCXO. The time required to search a cell may increase one hundred fold from outdoors to indoors. For example for indoors, each cell may take 100 milliseconds because of the weaker signal strength. This results in a greatly increased search time for indoor receivers.

This problem may be addressed by using parallelism in the frequency domain, for example sixteen fast Fourier transform channels or by parallelism in the time domain, using parallel correlators. To achieve parallelism may require faster clocks and/or more hardware which may be disadvantageous. Additionally, more hardware and/or faster clocks may require increased power.

In any event, one limit is the stability of the reference clock which may prevent bandwidth reduction to the degree required for indoor sensitivity.

As already mentioned the indoor signals can be attenuated by at least 20 dB from their outdoor equivalents. To increase the sensitivity by 20 dB for the indoor signals means integrating for a hundred times longer. However, this may be difficult to achieve because as the coherent integration period is extended, the bandwidth of the channel is narrowed. This in turn requires many more searches to be carried out and eventually the stability of the reference oscillator becomes a limiting factor as a signal appears to wander from one frequency to another, even before acquisition is completed. This results in a spreading of the energy, preventing further gain.

In addition, the modulation method used may provide a limit on the integration time.

Thus there may be problems in performing integration with such signals. The integration time may be limited by the accuracy of a local clock and the frequency shifts caused by relative motion of the satellite and receiver.

BRIEF SUMMARY OF THE INVENTION

Aspects of some embodiments of the invention may be seen from the appended claims.

BRIEF DESCRIPTION OF THE DRAWINGS

Some embodiments will now be described by way of example only to the accompanying figures, in which.

DETAILED DESCRIPTION OF THE INVENTION

Figure 1:
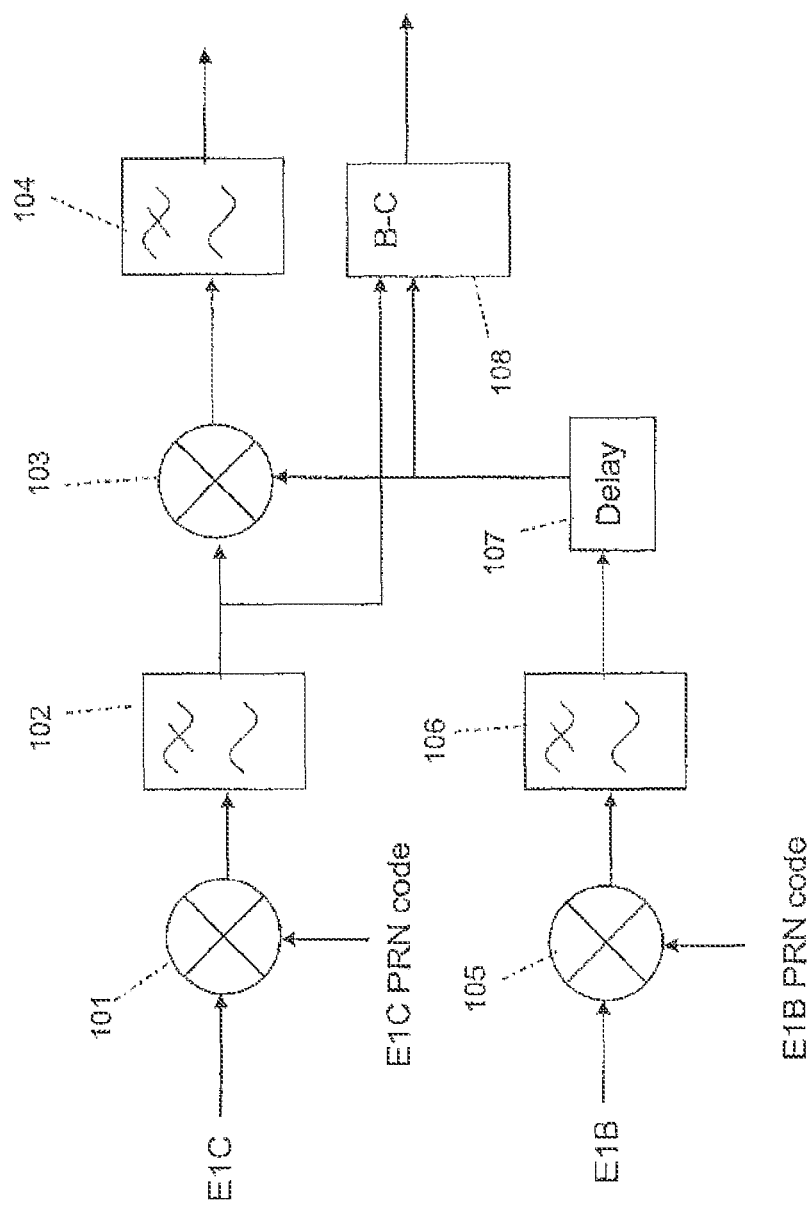
FIG. 1 shows circuitry of an embodiment.

The embodiments described are in relation to a GNSS receiver for GNSS signal acquisition and tracking. Some embodiments are particularly but not exclusively applicable to the GALILEO or any other global navigation satellite system.

Some embodiments may be used for the acquisition and/or tracking of broadcast pseudo random codes, in particular codes transmitted as part of a satellite navigation signal such as a GNSS signal.

It should be appreciated that whilst some embodiments may be used particularly in the context of acquisition of signals for global navigation satellite systems, some embodiments can be used for the acquisition of any other signals.

Some embodiments may be particularly applicable to the acquisition of spread spectrum signals.

It should be appreciated that some embodiments may be implemented to provide a software equivalent to the circuitry shown in the embodiments described hereinafter. Some embodiments may be implemented in hardware only. Some embodiments of are implemented in both hardware and software.

The acquisition circuitry can be incorporated in any suitable device which is to provide a positioning functionality. The device can be a portable device or part of a larger device. For example some embodiments may be incorporated in satellite navigation devices, communication devices such as mobile communication devices for example mobile phones or any device requiring position information. The satellite navigation devices can be stand alone devices or devices incorporated in various different forms of transport such as cars, trains, aeroplanes, balloons, ships, boats, trucks, helicopters or any other form of transport.

Some embodiments, which will now be described, are incorporated in an integrated circuit or set of integrated circuits (chip set). However, it should be appreciated that alternative embodiments may be at least partially implemented in discrete circuitry.

Both Galileo and GPS-III L1C (one version of GPS) offer dual component open civil signals on L1. This is targeted at one for data-download, which is necessary but restricts tracking performance, and one for accurate high sensitivity tracking unimpeded by data-transitions.

For tracking, this works well, however before tracking, the receiver must acquire the signal, that is achieve precise time and frequency lock. Generally this may not be achieved sequentially. Both should be correct or no signal energy may be recovered.

However other performance improvements such as cross-correlation and interference rejection have led to spreading codes to become longer, for example from 1 ms in GPS C/A code to 4 ms in Galileo to 10 ms in GPS-III. This makes the acquisition task even harder, on a square-law basis.

Additionally faster communication rates may mean that problematic data edges occur much more frequently from 20 ms in GPS C/A to 4 ms in Galileo and 10 ms in GPS-III. Consumer sensitivity requirements have gone from 40 dB CNo to 10 dB CNo (indoor) over the last 25 years (×1000) which makes the acquisition of the signals about 100 times harder. Furthermore the consumer now expects instant response, while 25 years ago a 10 minute start up time was acceptable.

The simple response of transmit more power may not be an option in some scenarios. Keeping each signal well below thermal noise means many satellites can coexist. Raising the power of an individual component will result in greater wideband noise for all other systems, and greater cross-correlation interference for those with similar code characteristics.

Having discussed the problems caused to acquisition by transitions on the pilot, it is generally not a solution to transmit a pure pilot, at least in some embodiments. At the sensitivities of modern receivers, there are many spurious energy contributors, both from the sky and from clocks in and near the receiver. These spurious energy contributors may be misinterpreted as the pilot, causing false acquisitions. Thus a pattern of data is provided on the pilot, and may be known in advance.

As will be discussed in more detail below, the data may be known just one symbol in advance from another part of the signal.

The purpose of a pilot may be to allow long term coherent integration, to gather energy in acquisition and/or to run a noise-free or low noise PLL (phase locked loop) in tracking.

Receivers can store the raw correlator outputs until the data-bits have been detected, then strip the data-bits, allowing continuous integration for the PLL, subject to some small error rate in the data detection. Other receivers actively strip the data using a communication link from the internet or the like so that the receivers know the data bits for removal.

With time assistance, the secondary code in the receiver can be pre-aligned, allowing removal of the code from the signal and full integration. It is not true fine time (10 us), but it is much more precise than coarse time (2 seconds). The requirement is much better than 4 ms, i.e. 2 ms.

Unaided, a 32 kHz watch crystal in the receiver may be 100 ppm, which can have a 4 ms error after 40 seconds. Good receivers may try to pre-calibrate their watch crystals, but this is very hard due to changes in voltage between operating and standby, and unknown temperature profiles, unrecorded because the receiver is off.

There is a method of acquiring the secondary code unaided at full sensitivity in about 100 mS. This works very well in software receivers where memory is available, but is not viable in normal receivers. This is to record the full acquisition engine results (4092 IQ pairs) for 25 consecutive 4 ms epochs. These are then post processed against the 25 possible secondary code phases, giving an ideal result. However with 4092×2×25×16 bit, this requires 409 kbytes of memory for each acquisition channel. In typical applications eight acquisition channels may be provided resulting in a requirement of 3.2 Mbytes of memory.

FIG. 1 shows circuitry for implementing one described embodiment. It will be appreciated that FIG. 1 shows the real parts (I) of signals therein and the processing of those real parts. Similar circuitry and processing is provided for the imaginary parts (Q).

A first signal is input to a first mixer 101. The first signal may be an E1C signal of a GNSS system such as GALILEO. The E1C signal may be a pilot signal however differs from existing pilot signals in that E1C also carries data. The first signal may comprise a carrier, a primary spreading code c and data and may be on a C channel. The frequency of the E1C signal is relatively unknown due to satellite Doppler, user Doppler and reference oscillator error. The frequency of the signal can be represent by F+x where x can be a positive or negative quantity. F represents the frequency with which the satellite intends to transmit the signal and x represent the error from one or more of the factors mentioned above, or indeed any other factor.

The first mixer 101 mixes the E1C signal with a known spreading code c. The output of the first mixer 101 is input to a first correlator 102. The first correlator 102 correlates the output of the first mixer 102 with the known spreading code c.

The output of the first correlator 102 is input into a third mixer 103 and into a B-C block 108.

Also in FIG. 1, a second signal is input to a second mixer 105. Similarly, the second signal may be an E1B signal of a GNSS system such as GALILEO. The E1B signal may be a data signal. The second signal may comprise a carrier, a primary spreading code b and data and may be on a B channel. The frequency of the E1B signal is the same as that of the E1C signal. The second mixer 105 mixes the E1B signal with a known spreading code b. The output of the second mixer 105 is input to a second correlator 106. The second correlator 106 correlates the output of the second mixer 106 with the known spreading code b.

The output of the second correlator 106 is input in a delay block 107. The delay block 107 delays the output of the second correlator 106 such that the data carried in that signal is delayed by one symbol. The output of the delay block 107 is input into the third mixer 103 and into the B-C block 108. On Galileo, with only one code epoch per symbol, there is no difficulty with start and end of symbol as this is the same as the code for the correlator bin that gives maximum power.

The third mixer 103 mixes the output of the first correlator 102 with the output of the delay block 107. In FIG. 1, the third mixer 103 has real components as inputs. It will be appreciated that the similarly processed corresponding Q components (not shown) will also be input into mixer 103. Mixer 103 therefore provides a full complex multiply.

The signals input into the third mixer 103 carry frequency components from the carrier signal including frequency shifts and offset due to the above mentioned factors. In practice the E1C and E1b signals input into the first and second mixers may be already downconverted to only comprise the offset frequency x and not the carrier frequency F. However in some embodiments, the carrier frequency F component may not have been removed.

The signals input into the third mixer 103 also comprise identical data carried in each signal. The delay block 107 realigns the data carried on E1B to the data carried on E1C. The data on the output of the delay block 107 is a data symbol behind due to the delay and therefore is in line with the delayed data on the E1C channel.

The third mixer 103 mixes the output of the first correlator 102 and the output of the delay block 107. The mix of the data carried in each input signal effectively removes data from mix. This is because the aligned data on both input signal is effectively squared and becomes substantially unity.

The output of the third mixer 103 is input into a third correlator 104 where it is integrated to produce a feedback amplitude and phase for tracking the code and frequency of the signals received by a GNSS receiver that embodiments may be implemented in.

An IQmix process is a form of multiplication between each output sample from a correlator and the preceding output sample. This is achieved by a delay that keeps the previous sample available.

The simplest case is simply I.I'+Q.Q', a scalar output. However a benefit is to implement the full complex multiply with the complex conjugate of the previous sample, which yields a full complex output whose phase angle represents the residual rotation, or frequency, of the signal. For constant frequency, it is thus a constant value that can be integrated.

When using IQmix on the 20 individual code epochs of the CA code signal, at each data bit transition the output inverts for one period. Statistically this is one negative period every 40 ms, i.e. yield is 38/40, an insignificant loss in dB.

When operating with 20 ms periods, there is no loss unless an erroneous decision is made, as the data bit is decided, and removed, before integration.

By inserting a delay in the B channel at the receiver, the data in the B and the C channel are now aligned. An IQ mix can therefore be carried by mixer 103 using the signal on the B channel from delay 107 and the signal on the C channel from correlator 102. Thus the IQmix arrangement sees the carrier from time n and time n+1, and thus implicitly measures the phase difference and thus the frequency. However the data component in each of these has been aligned and is the same, resulting in (data squared) in the result, which is always +1 and thus ignored. The data is either +1 or −1.

This amplitude and phase feedback can be used to more accurately remove the frequency components from the received signal. In other words the processing can be focussed on the frequency at which the signal is actually received and not on the wider range of the expected frequency with the associated error range.

The IQmix output is constant over time, with its amplitude representing the signal amplitude (a DC, unipolar scalar) (plus noise that is AC, i.e. bipolar), and its phase representing frequency (also a DC, unipolar scalar, carrying noise that is AC/bipolar)

Thus both amplitude and phase can be integrated without limit other than vehicle and clock dynamics, so the noise component on both, being zero-centred, averages to zero The output of the first correlator 102 and the output of the delay block 107 are also input into a B-C block 108. The B-C block is operable to find the difference between the output of the second correlator 102 and the output of the delay block 107. The inputs of the B-C block carry identical carrier information. In other words both inputs carry identical frequency and offset values and these are cancelled by the B-C block 108, The B-C block extracts the data from the two input signals and output a data signal.

Thus the B-C block 108 sees inputs with the same data, and when tracking correctly at zero frequency error, the same carrier phase. However they have independent noise components, both because they have come through different despreading codes, and from different timeslots, so give 3 dB improved SNR (signal to noise ratio) both for data extraction and for PLL operations when required.

The B-C block 108 adds the energy of the input from the C channel and the input from the B channel. As discussed these inputs have identical data but independent noise and thus the B-C block doubles the signal but not the noise giving an improvement in the SNR. In some embodiments the data on the C-channel is transmitted inverted thus the B-C block 108 may be a B+ (−C) block.

In the above manner the shared carrier frequency of the E1C and E1B signal may be taken advantage of to quickly and accurately acquire and track a satellite without having to acquire a secondary signal.

Some applications, particularly applications that are stationary may require a pilot signal. A pilot signal is a signal that carries no data and thus may be integrated for a long period of time in order to very accurately determine a position. However in embodiments both the E1C and E1B signals carry data making them inappropriate as a pilot signal.

Figure 2:
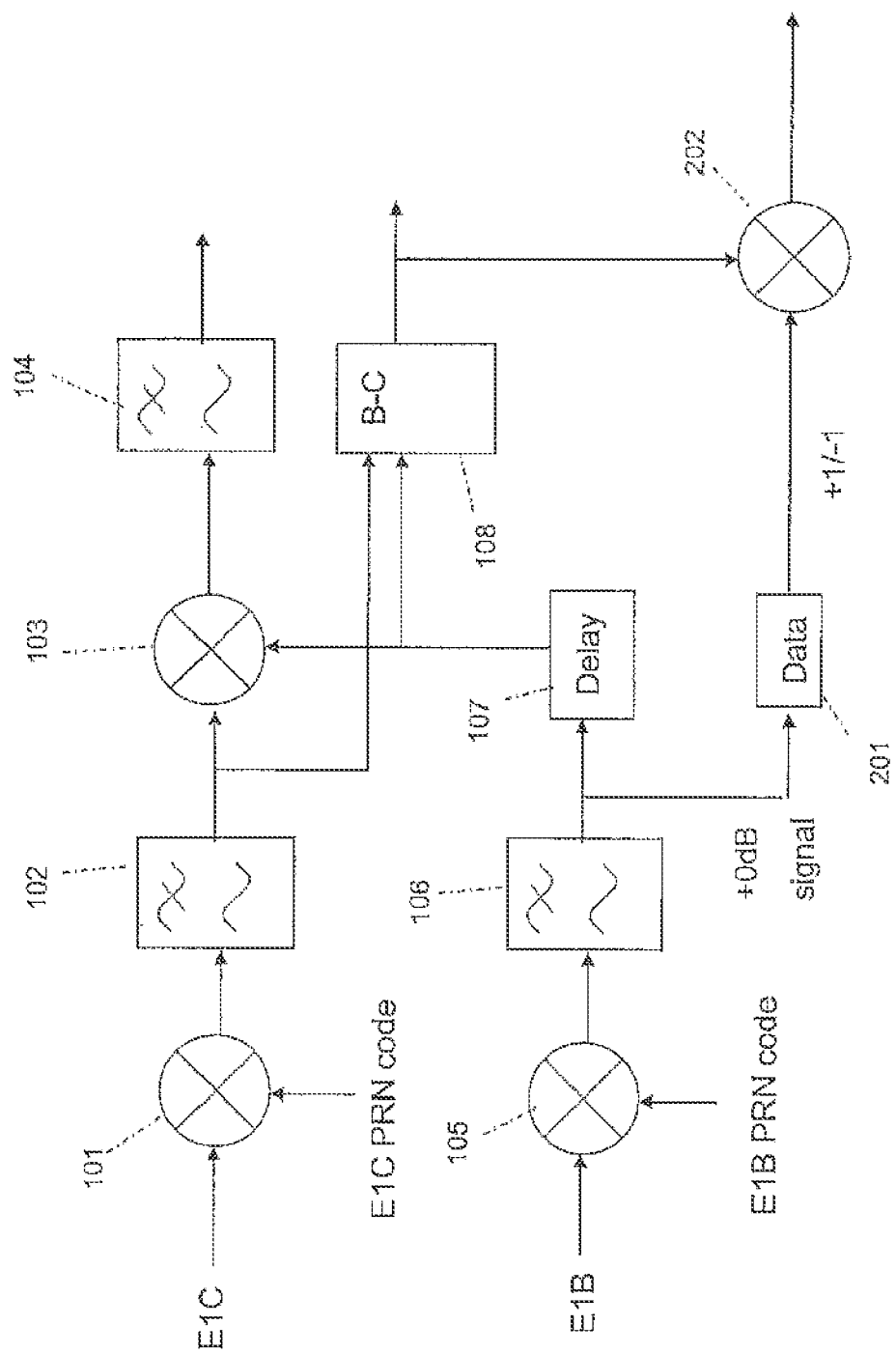
FIG. 2 shows circuitry of an embodiment providing a pilot signal.

FIG. 2 depicts how a pilot signal may be recovered in embodiments.

FIG. 2 comprises a first signal E1C input into a first mixer 101. The first mixer 101 has a further input of a known spreading code c. The output of the first mixer is input into a first correlator 102. The output of the first correlator 102 is input into a third mixer 103 and a B-C block 108.

FIG. 2 also comprises a second signal E1B input into a second mixer 105. The second mixer 105 has a further input of a known spreading code b. The output of the second mixer 105 is input into a second correlator 106. The output of the correlator 106 is input into a delay block 107. The output of delay block 107 is input into the third mixer 103 and into the B-C block 107.

The output of the third mixer 103 is input into a third correlator 104.

It will be appreciated that the above components of FIG. 2 are the same as those of FIG. 1 and function similarly therefore no further explanation will be given with regards to the abovementioned components.

The output of the second correlator 106 is further input into a data block 201. The data block 201 provides an input to a fourth mixer 202. The output of the B-C block 108 is also input into the fourth mixer 202. The output of the fourth mixer 202 provides the pilot signal.

Thus if users require a legacy pure pilot, it can be created either from the (B-C) stream, with 3 dB signal improvement and traditional data removal. In this the data can be stripped from the output of the B-C stream to leave the pure pilot.

However if a pilot in the style of a hardware receiver is required, with no delay, the data can be extracted from the B channel only, as shown in FIG. 2. This does not benefit from the 3 dB gain, but is available in advance of the incoming C channel stream. The incoming C stream can then be multiplied by the Data-symbol from the B channel and accumulated. The stream used can be pure C, or it can also be the B-C stream as shown. The B-C stream carrier is less noisy, 3 dB stronger, but due to the embedded delay in the B contribution to the carrier, may be a little less responsive in high-dynamics operation. This is not usually an issue for surveying.

Figure 3:
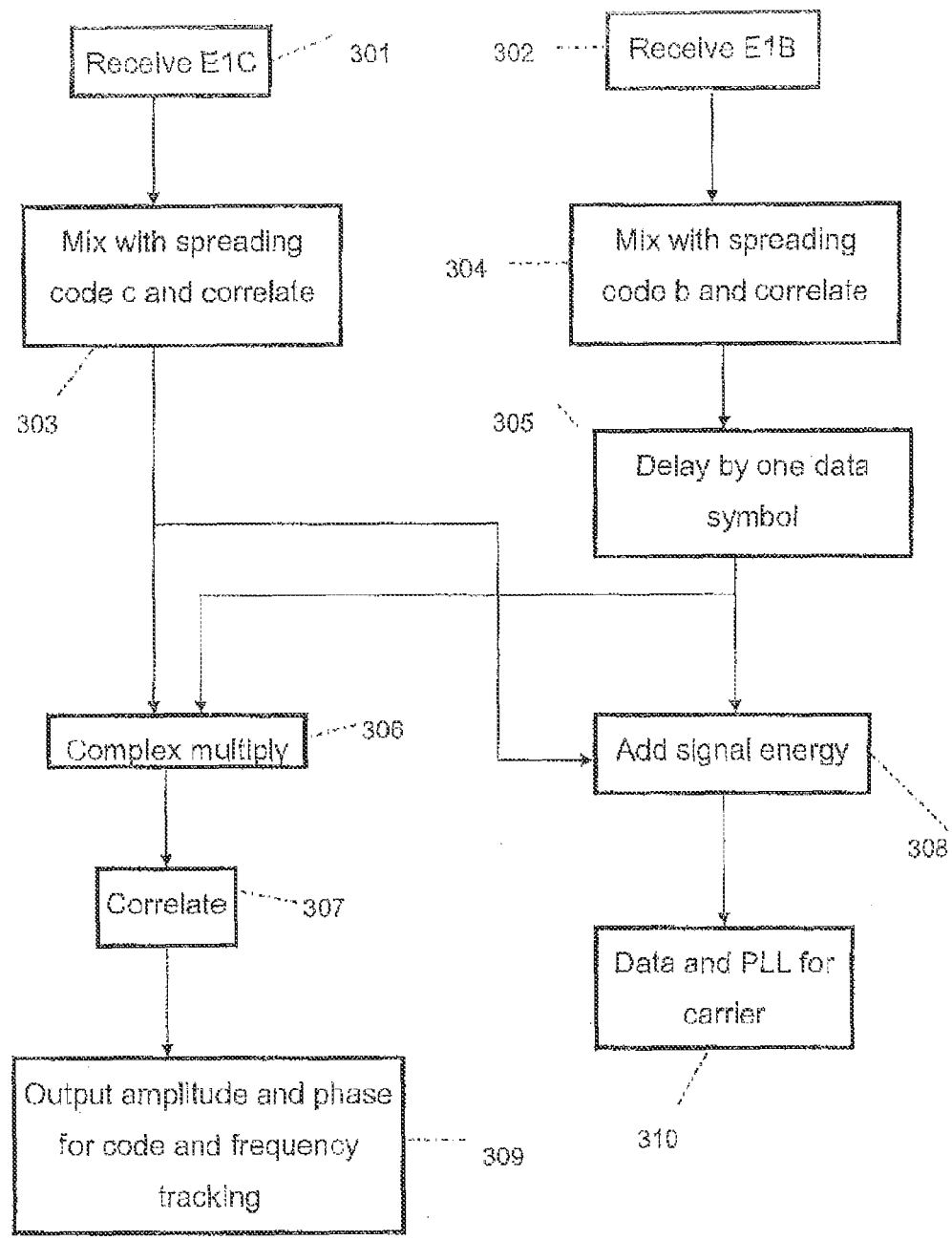
FIG. 3 shows the method of an embodiment.

FIG. 3 shows the method carried out in accordance with some embodiments.

At step 301, the E1C signal is received on the C-channel. This signal is mixed and correlated with a known primary spreading code c at step 303.

At step 302, the E1B signal is received on the B-channel. This signal is mixed and correlated with a known primary spreading code b at step 303 and then delayed by one data symbol at step 305.

The correlated signal from step 303 and delayed correlated output from step 304 are complex multiplied together in step 306. The complex multiplied output of step 306 is correlated at step 307. Step 306 and 307 provides the IQmix of the signal E1C and delayed signal E1B in accordance with the above description.

The correlated signals at step 307 are then output as amplitude and phase for code and frequency tracking at step 309.

The correlated output from step 303 and delayed correlated output from step 305 are added such that the energy of each input signal is added in step 308 where the energy of each input signal is added. This may be carried out by the B-C block 108 of FIGS. 1 and 2. The output of step 310 provides a data signal and a PLL (Phase-lock loop) signal for the carrier signal.

Figure 4:
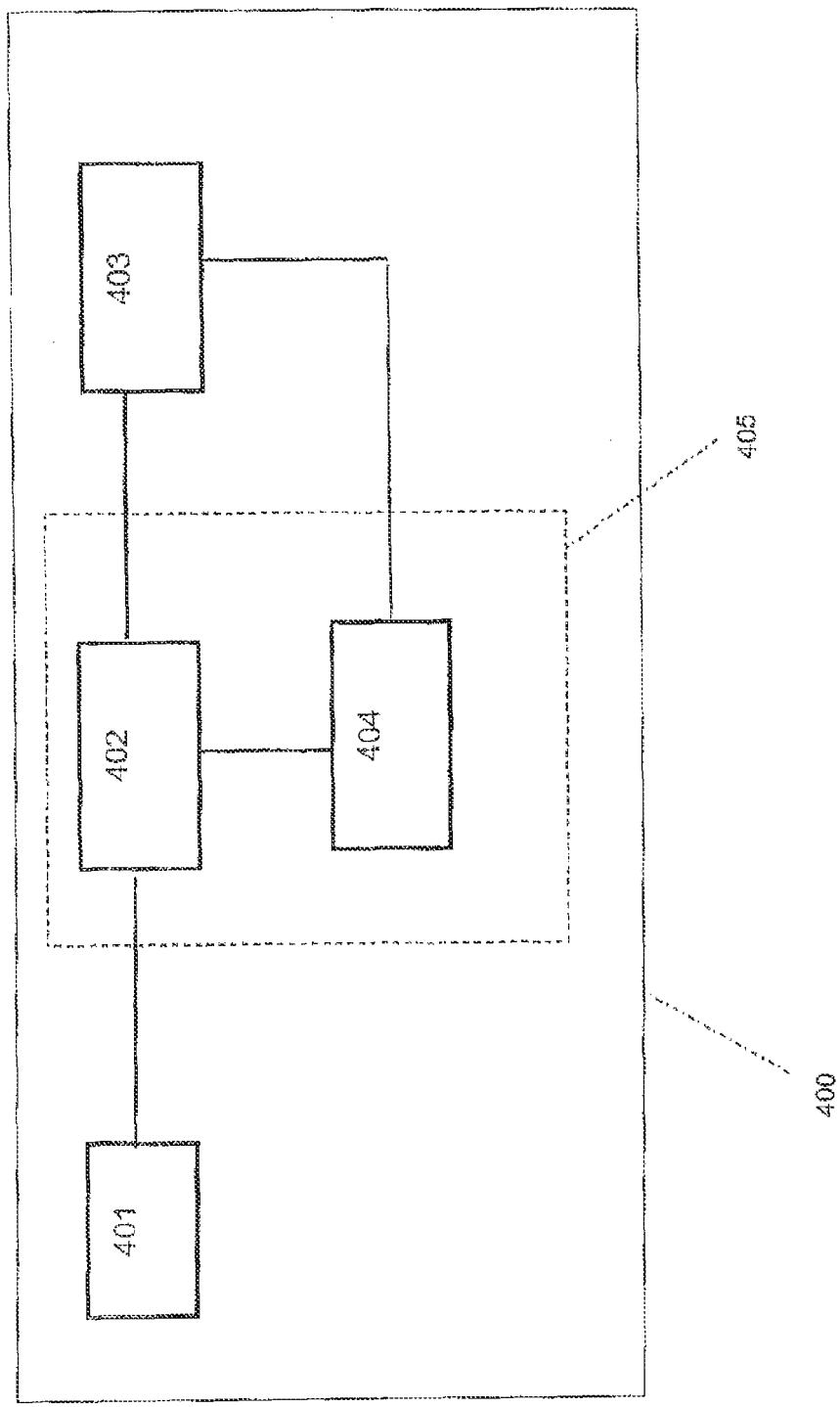
FIG. 4 shows an exemplary receiver in accordance with embodiments.

FIG. 4 provides a block diagram of an exemplary receiver in accordance with an embodiment.

The GNSS receiver 400 may be a GALILEO receiver or receiver for any other GNSS system. The GNSS receiver 400 comprises a signal receiver 401 that may receive signals from satellites in the GNSS system. The signal receiver 401 may carry out basic signal processing such as for example filtering and down-conversion in order to provide the signal in a suitable form to acquisition and tracking block 402. The Acquisition and tracking block may carry out the method in accordance with FIG. 3 or the processing in accordance with FIGS. 1 and/or 2.

The signal receiver 401 also comprises a position calculation block 404 which may receive data from acquisition and tracking block 402 and carry out a position calculation for the GNSS receiver 400. The GNSS receiver 400 may further comprise a memory 403 which may be used by acquisition and tracking block 402 and position calculation block 404.

It will be appreciated that individual blocks 402 and 404 may have individual memory or share a memory with further processing blocks. It will also be appreciated that the functional blocks provided within dotted line 405 may be implemented on a single processor. It will be appreciated that multiple processors may be used. It will be appreciated that the above method may be carried out on one or more integrated circuits.

It should be appreciated that in the accompanying drawings all elements exist in I and Q. The real components only are shown for simplicity.

Some embodiments comprise a first signal and a second signal as described previously. Thus the first signal may comprise a carrier, a primary spreading code c and data and may be on a C channel. The second signal may comprise a carrier, a primary spreading code b and data and may be on a B channel. The data of the first channel is the same as the data on the second channel but has been delayed by one symbol. It should be appreciated that in alternative embodiments the delay may be n symbols. N may be an integer equal to 1 or more.

Some embodiments of the invention comprise a transmitter configured to transmit the first and second signal described above and/or control circuitry configured to control a transmitter to transmit the first and second signals. The transmitter may be provided by a satellite or a transmitter on the ground.

Either channel could be delayed at the satellite. In the described embodiments the C channel is delayed. In alternative embodiments, the B channel may be delayed.

Furthermore, embodiments of the present invention have been described primarily in the context of obtaining data from satellite navigation signals. However, it should be appreciated that embodiments of the present invention can be used for processing any two or more signals transmitted from a common source on the same carrier frequency but with different spreading codes.

Embodiments of the invention have been in the context of the acquisition and tracking of a signal. Particular advantages may be achieved in the context of acquisition. It should be appreciated that other embodiments may be applied to any other suitable signal.

The invention claimed is:

1. An apparatus comprising:
 a first correlator configured to correlate a first channel with a first code to provide a first output, said first channel having a carrier frequency and data;
 a second correlator configured to correlate a second channel with a second code to provide a second output, said second code being different from said first code, said second channel having the same carrier frequency as the first channel and the same data as the first channel, wherein each of real (I) and imaginary (Q) parts of the second output are delayed relative to respective parts of said first output such that said data on the second channel is delayed with respect to the data on the first channel, thereby providing a delayed second output; and
 a processor configured to process the first output and delayed second output, said data on said first output being aligned with the delayed second output to provide frequency information about said carrier.

2. The apparatus as claimed in claimed in claim 1, comprising a delay, said delay configured to delay said second output and provide delayed second output to said processor.

3. The apparatus as claimed in claim 2, wherein said delay is configured to delay said second output such that said data in said delayed second output is aligned with the data in said first channel.

4. The apparatus as claimed in claim 1, wherein said data in said second channel is delayed with respect to said data in the first channel by n symbols.

5. The apparatus as claimed in claim 1, wherein said frequency has a value of F−/+x where F is the target transmission frequency and x is an error.

6. The apparatus as claimed in claim 1, wherein said frequency information comprises phase information.

7. The apparatus as claimed in claim 1, further comprising a mixer arranged to correlate said first and second outputs to provide the third output.

8. The apparatus as claimed in claim 1, further comprising data recovery circuitry operable to receive said first and second output.

9. An integrated circuit or chip set comprising an apparatus as claimed in claim 1.

10. A positioning device comprising an apparatus as claimed in claim 1.

11. A method comprising:
correlating a first channel of a received signal with a first code to provide a first output, said first channel having a carrier frequency and data;
correlating a second channel of said received signal with a second code to provide a second output, said second code being different from said first code, said second channel having the same carrier frequency as the first channel and the same data as the first channel, wherein each of real (I) and imaginary (Q) parts of the second output are delayed relative to respective parts of said first output such that said data on the second channel is delayed with respect to the data on the first channel, thereby providing a delayed second output; and
providing frequency information about said carrier by processing the first output and delayed second output, said data on said first output being aligned with the delayed second output.

12. The method as claimed in claimed in claim 11, comprising delaying said second output and processing said delayed second output.

13. The method as claimed in claim 12, wherein said delaying said second output further comprises delaying said second output such that said data in said delayed second output is aligned with the data in said first channel.

14. The method as claimed in claim 11 wherein said data in said second channel is delayed with respect to said data in the first channel by n symbols.

15. The method as claimed in claim 11, wherein said frequency has a value of F−/+x where F is the target transmission frequency and x is an error.

16. The method as claimed in claim 11 wherein said frequency information comprises phase information.

17. The method as claimed in claim 11 further comprising:
mixing said first and second outputs to provide the third output.

18. The apparatus comprising:
a first correlator configured to correlate a first signal component with a first code to provide a first output, said first signal component having a carrier frequency and data;
a second correlator configured to correlate a second signal component with a second code to provide a second output, said second code being different from said first code, said second signal component having the same carrier frequency as the first signal component and the same data as the first signal component, wherein each of real (I) and imaginary (Q) parts of the second output are delayed relative to respective parts of said first output such that said data on the second signal component being delayed with respect to the data on the first signal component, thereby providing a delayed second output; and
a processor configured to process the first output and delayed second outputs, said data on said first output being aligned with the delayed second output to provide frequency information about said carrier.

* * * * *